(12) United States Patent
Cole et al.

(10) Patent No.: US 8,785,701 B2
(45) Date of Patent: Jul. 22, 2014

(54) CO-PROCESSING OF DIESEL BIOFEED AND KEROSENE RANGE HYDROCARBONS

(75) Inventors: Kathryn Y. Cole, Easton, PA (US); William E. Lewis, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 610 days.

(21) Appl. No.: 12/653,480

(22) Filed: Dec. 15, 2009

(65) Prior Publication Data

US 2010/0175308 A1 Jul. 15, 2010

Related U.S. Application Data

(60) Provisional application No. 61/203,628, filed on Dec. 24, 2008, provisional application No. 61/204,056, filed on Dec. 31, 2008.

(51) Int. Cl.
| | | |
|---|---|---|
| *C07C 1/20* | (2006.01) | |
| *C07C 4/06* | (2006.01) | |
| *C10G 45/00* | (2006.01) | |

(52) U.S. Cl.
USPC ........... 585/240; 208/142; 585/241; 585/242; 44/605

(58) Field of Classification Search
USPC .................. 585/240–242; 208/107, 142–143; 44/605
See application file for complete search history.

(56) References Cited

U.S. PATENT DOCUMENTS

| 4,992,605 A | 2/1991 | Craig et al. |
| 2006/0186020 A1 * | 8/2006 | Gomes ............................ 208/46 |
| 2007/0135666 A1 | 6/2007 | Koivusalmi et al. |
| 2007/0175795 A1 * | 8/2007 | Yao et al. ....................... 208/142 |
| 2007/0260102 A1 * | 11/2007 | Duarte Santiago ........... 585/733 |
| 2008/0161614 A1 | 7/2008 | Bertoncini et al. |

FOREIGN PATENT DOCUMENTS

| EP | 1 741 768 A1 | 1/2007 |
| EP | 1741768 A1 * | 1/2007 |
| EP | 1 857 525 A1 | 11/2007 |
| EP | 1956070 A1 | 6/2008 |
| EP | 1 693 432 B1 | 9/2009 |
| FR | 2 910 485 A1 | 6/2008 |
| WO | 2007/003709 A1 | 1/2007 |
| WO | 2007003708 A1 | 1/2007 |
| WO | WO 2007098928 A1 * | 9/2007 |
| WO | 2007/125332 A1 | 11/2007 |
| WO | 2008/087269 A2 | 7/2008 |
| WO | 2008/087279 A2 | 7/2008 |
| WO | 2009/082366 A1 | 7/2009 |

OTHER PUBLICATIONS

Walendziewsky, J., Stolarski, M., Luzny, R., Klimek, B.: "Hydroprocessing of light gas oil—rape oil mixtures", Fuel Processing Technology, vol. 90, No. 5, Jan. 22, 2009, pp. 686-691, XP002582117.

Anonymous: "Fractional Distillation of Petroleum", Thinkquest Library: Petroleum Oil, XP002582118, (2009).

* cited by examiner

*Primary Examiner* — Pamela H Weiss
(74) *Attorney, Agent, or Firm* — David M. Weisberg; Bruce M. Bordelon; Chad A. Guice

(57) ABSTRACT

Processes are provided for producing a diesel fuel product having a sulfur content of 10 ppm by weight or less from feed sources that include up to 50% by weight of a biocomponent feedstock. The biocomponent feedstock is co-processed with a heavy oil feed in a severe hydrotreating stage. The product from the severe hydrotreatment stage is fractionated to separate out a diesel boiling range fraction, which is then separately hydrotreated.

9 Claims, No Drawings

CO-PROCESSING OF DIESEL BIOFEED AND KEROSENE RANGE HYDROCARBONS

This application claims the benefit of U.S. Provisional 61/203,628 filed Dec. 24, 2008. This application also claims the benefit of U.S. Provisional 61/204,056 filed Dec. 31, 2008.

FIELD OF THE INVENTION

This invention provides a process for the manufacture of diesel range hydrocarbons that are low in sulfur and that include up to 50% by weight of a biocomponent feedstock. Particularly the invention relates to a multi-stage co-hydrotreating process for the manufacture of diesel range hydrocarbons from at least one biocomponent feedstock and at least one mineral hydrocarbon feedstock.

BACKGROUND OF THE INVENTION

Fuels based on biocomponent sources will become increasingly prevalent in the future. Already, various governments have instituted current and future requirements that motor fuel pools contain a minimum percentage of fuel derived from a biocomponent source, such as a plant, animal, fish, or algae based oil or fat.

Producing diesel fuel from biocomponent sources presents a variety of challenges. In particular, for diesel hydroprocessing units that operate at low pressures, the presence of the additional heteroatoms in a biocomponent based diesel feed may pose difficulties. Modifying and/or replacing low pressure units to allow for higher processing pressures would require expensive capital investment.

What is needed is a method to allow for hydroprocessing of diesel feeds that are at least partially based on a biocomponent source without requiring significant new construction at refineries. The method should allow for production of an ultra low sulfur diesel product.

EP1693432 describes co-processing of vegetable oils with various diesel type mineral refinery feeds. The method appears to include combining a vegetable and mineral oil, hydrotreating the combined oil, and stripping off gas phase products.

US Published Patent Application 2008/0161614 describes two stage co-processing of a feed including both vegetable/animal and mineral oil. The first stage is operated at lower severity to primarily treat the vegetable and/or animal oil in the feed. The product of the first stage is then stripped to remove gas phase impurities. The stripped product is then hydrotreated in a more severe hydrotreatment stage to produce a diesel fuel.

SUMMARY OF THE INVENTION

In an embodiment, a method is provided for producing a low sulfur diesel product. The method includes forming a blended feedstock containing both a mineral portion and from about 0.1 wt % to about 50 wt % of a diesel boiling range biocomponent portion, the mineral portion having a boiling range from about 125° C. to about 300° C. The blended feedstock is then hydrotreated under effective hydrotreating conditions including an LHSV of 0.5 to 1.5, a hydrogen partial pressure from about 100 to about 500 psig, a treat gas rate of about 2000-3000 scf/b of at least 80% hydrogen (remainder inert gas), and a temperature of from about 500-750° F., to produce a diesel fuel product.

DETAILED DESCRIPTION OF THE PREFERRED EMBODIMENTS

This invention provides processes for producing diesel fuels that include up to 50% by weight of a biocomponent feedstock and also have sulfur levels of 10 ppm or less. In an embodiment, the desired goals of the invention are achieved by co-processing a biocomponent feedstock with a mineral feedstock that boils in the kerosene range. Biocomponent feedstocks often have less desirable cold flow properties, such as cloud point or pour point. Mixing a biocomponent feedstock with a mineral feed boiling in the kerosene range improves the cold flow properties of the overall feedstock. Because of the improvement in cold flow properties, the product resulting from processing of the mixture of biocomponent and mineral kerosene feed should be suitable for use as a diesel fuel. This avoids the need for blending the processed mixture with other streams in order to form a suitable product.

The desired goals of the invention are achieved by co-processing a biocomponent feedstock with a mineral feedstock. The mineral feedstock can have a boiling range of from about 125 to about 300° C., preferably from about 150 to about 275° C. The mineral feedstream can contain greater than 50 wppm sulfur. Examples of suitable feedstreams include virgin kerosene and cracked kerosene. The amount of biocomponent feedstock included in the total feed can be at least about 0.1 wt %, or at least 1 wt %. The amount of biocomponent feedstock in the total feed can be 50 wt % or less, or 20 wt % or less, or 10 wt % or less. The blending of biocomponent feedstock with mineral feedstock can provide various advantages. If the mineral feed includes sulfur, blending the mineral feed with biocomponent feed will provide a total feed with a reduced sulfur content. With respect to the biocomponent feed, blending with the mineral kerosene feed improves the cold flow properties of the resulting total feed.

In the discussion below, a biocomponent feedstock refers to a hydrocarbon feedstock derived from a biological raw material component, such as vegetable fats/oils or animal fats/oils (including fish and algae fats/oils). Note that for the purposes of this document, vegetable fats/oils refer generally to any plant based material, and include fat/oils derived from a source such as plants from the genus *Jatropha*. The vegetable oils and animal fats that can be used in the present invention include any of those which comprise primarily triglycerides and free fatty acids (FFA). The triglycerides and FFAs contain aliphatic hydrocarbon chains in their structure having 8-24 carbons. Other types of feed that are derived from biological raw material components include fatty acid esters, such as fatty acid methyl esters. Examples of biocomponent feedstocks include but are not limited to rapeseed (canola) oil, corn oil, soy oils, castor oil, and palm oil.

In various embodiments of the invention, the feed can include varying amounts of feedstreams based on biocomponent sources, such as vegetable oils, animal fats, fish oils, algae oils, etc. The feed can include at least 0.1 wt % of feed based on a biocomponent source, or at least 0.5 wt %, or at least 1 wt %, or at least 3 wt %, or at least 10 wt %, or at least 15 wt %. In such embodiments, the feed can include 60 wt % or less of biocomponent, or 50 wt % or less, or 40 wt % or less, or 30 wt % or less. In other embodiments, the amount of co-processing can be small, with a feed that includes at least 0.5 wt % of feedstock based on a biocomponent source, or at least 1 wt %, or at least 2.5 wt %, or at least 5 wt %. In such an embodiment, the feed can include 20 wt % or less of biocomponent based feedstock, or 15 wt % or less, or 10 wt % or less, or 5 wt % or less.

Biocomponent based diesel boiling range feedstreams typically have low nitrogen and sulfur content. For example, a biocomponent based feedstream can contain up to about 300 wppm nitrogen. Instead of nitrogen and/or sulfur, the primary heteroatom component in biocomponent based feeds is oxygen. Suitable biocomponent diesel boiling range feedstreams can include up to about 10-12 wt % oxygen.

Preferably, the amount of biocomponent feed can be selected to allow processing of the mixture of biocomponent and mineral feed under typical hydrotreating conditions in a hydrotreatment reactor while achieving a desired target sulfur level. Due to the excess oxygen present in a biocomponent feed, biocomponent feeds can pose difficulties during hydrotreating. For example, hydrotreatment of biocomponent feeds can produce more excess heat than is typical during a conventional hydrotreating process. The additional oxygen can also lead to substantial $H_2O$, CO and/or $CO_2$ formation, which can inhibit the activity of hydrotreatment catalysts. In order to determine an appropriate amount of biocomponent that can be added to a mineral feed, a pre-evaluation can be performed. The pre-evaluation can be performed to estimate the additional heat, water, CO, and $CO_2$ that are released from a particular biocomponent feed during hydroprocessing. The pre-evaluation can include using a thermodynamic calculation, using modeling to predict the outputs from exposing a feed to a catalyst, or performing a pilot plant experiment.

The combined feedstock is introduced into a hydrotreatment reactor that includes one or more catalyst beds that contain a hydrotreatment catalyst. The combined feedstock is exposed to each catalyst bed while being exposed to hydrodesulfurization and hydrodeoxygenation conditions. Such conditions will also result in olefin saturation of any olefins present in the biocomponent feedstock.

The catalyst in the hydrotreatment reactor can be a conventional hydrotreating catalyst, such as a catalyst composed of a Group VIB metal and/or a Group VIII metal on a support. Suitable metals include cobalt, nickel, molybdenum, tungsten, or combinations thereof. Preferred combinations of metals include nickel and molybdenum or nickel, cobalt, and molybdenum. Suitable supports include silica, silica-alumina, alumina, and titania.

The reaction conditions in the hydrotreatment reactor can be conditions suitable for reducing the sulfur content of the feedstream while also deoxygenating the feedstream and saturating olefins as the feedstream is exposed to the catalyst beds in the reactor. In a preferred embodiment, the reaction conditions of the hydrotreatment reactor are selected to perform a thorough hydrodeoxygenation while reducing the sulfur of the feedstock to a value between about 10 wppm and 200 wppm S. In still other embodiments, the sulfur can be reduced to about 1500 wppm or less, or about 1000 wppm or less, or about 500 wppm or less, or about 200 wppm or less. The sulfur can be reduced to about 100 wppm or more, or about 200 wppm or more, or about 500 wppm or more. The reaction conditions can include an LHSV of 0.5 to 1.5, a hydrogen partial pressure from about 100 to about 500 psig, a treat gas rate of less than about 3000 scf/b of at least 80% hydrogen (remainder inert gas), and a temperature of from about 500-750° F.

In yet another embodiment, the biocomponent portion of the feedstock can be pretreated to remove impurities prior to hydrotreatment. This pretreatment can occur prior to mixing the biocomponent portion of the feedstock with the mineral portion. The pretreatment can include passing the biocomponent portion through an adsorbent to remove metals, filtering the biocomponent portion to remove sediment, or other processes. Alternatively, an optional metals removal pretreatment can take place in the first reactor after mixing of the biocomponent and mineral hydrocarbon feeds, by exposing the combined feedstock to a demetallization catalyst under demetallization conditions prior to hydrodesulfurization and/or hydrodeoxygenation.

The output stream from hydrotreatment is a diesel fuel with an improved cetane number and a sulfur content of 10 ppm by weight or less. Optionally, the hydrotreatment may be conducted in multiple stages.

The output from hydrotreatment can be optionally passed to a separation zone for separation of a vapor phase stream and a liquid phase product stream. After such a separation, the liquid phase product stream can optionally be passed to a hydroisomerization stage. The hydroisomerization stage can be used to further improve the cold-flow properties of the liquid phase product stream. In another optional embodiment, the hydrotreated feed can be blended with a feed containing fatty acid methyl esters, to further increase the amount of biocomponent.

In the optional hydroisomerization stage, the liquid phase product stream from the second reactor is exposed to one or more reaction zones, optionally present in a separate reactor, that are operated at hydroisomerization conditions in the presence of hydroisomerization catalyst. Generally, catalytic dewaxing can be accomplished by selective hydrocracking or by hydroisomerizing long chain molecules within a feed such as a diesel range feed. Dewaxing catalysts are suitably molecular sieves such as crystalline aluminosilicates (zeolites) or silico-aluminophosphates (SAPOs). These catalysts may also carry a metal hydrogenation component, preferably Group VIII metals, especially Group VIII noble metals. Dewaxing conditions include temperatures of 280-380° C., pressures of 300-3000 psig, LHSV of 0.1-5.0 $h^{-1}$ and treat gas rates of from 500-5000 scf/bbl.

In various embodiments, the molecular sieve used for catalytic dewaxing is ZSM-48. ZSM-48 is a 10-member ring 1-D molecular sieve. ZSM-48 performs dewaxing primarily by isomerizing molecules within the feed. Typical silica to alumina ratios for the ZSM-48 are 250 to 1 or less, or 200 to 1 or less. Preferably, the silica to alumina ratio of the ZSM-48 is less than 110 to 1. To form a catalyst, the ZSM-48 can be composited with a binder. Suitable binders include silica, alumina, silica-alumina, titania, zirconia, or a mixture thereof. Other suitable binders will be apparent to those of skill in the art.

Optionally, before such a hydroisomerization step, the liquid stream can be passed through a liquid treatment step, such as by exposing the liquid to filtration, a caustic solution wash, or a treatment with chemical agents to remove sulfur and trace contaminants. Optionally, before isomerization, the product stream can be passed through an adsorber that may contain activated massive Ni, or ZnO as adsorbent to remove any mercaptans or carbonyl sulfides that are formed during hydrotreatment.

In a separate, alternative embodiment, a feedstock having a biocomponent origin and a kerosene feedstock can be blended after hydrotreatment of the biocomponent origin feed. In such an embodiment, a feedstock at least partially based on a biocomponent source can be hydrotreated to remove heteroatoms such as oxygen. The hydrotreated product can then be blended with a kerosene boiling range feed to improve the cold flow properties of the hydrotreated product.

What is claimed is:

1. A method for producing a low sulfur diesel product, comprising:

filtering a diesel boiling range biocomponent portion;

forming a blended feedstock containing both a mineral portion and from about 0.1 wt % to about 50 wt % of the diesel boiling range biocomponent portion, the mineral portion having a boiling range from about 125° C. to about 300° C.; and hydrotreating the blended feedstock under effective hydrotreating conditions wherein the effective hydrotreating conditions include hydrodesulfurization and hydrodeoxygenation conditions which include an LHSV of 0.5 to 1.5 hr$^{-1}$, a hydrogen partial pressure from about 100 to about 500 psig, a treat as rate of less than about 3000 scf/b of at least 80% hydrogen (remainder inert gas), and a temperature of from about 500-750° F., to produce a liquid phase product stream; and dewaxing the liquid phase product stream by contacting the liquid phase product stream with a dewaxing catalyst under dewaxing conditions which include a temperature from 280 to 380° C. (536 to 716° F.), a pressure from 30 to 3000 psig, an LHSV from 0.1 to 5.0 hr$^{-1}$, and a treat gas rate from 500 to 5000 scf/b to produce a diesel fuel product.

2. The method of claim 1, wherein the biocomponent feedstock comprises a plant oil or fat, an animal oil or fat, a fish oil or fat, or an algae oil or fat.

3. The method of claim 2, wherein the biocomponent feedstock comprises palm oil.

4. The method of claim 1, further comprising hydroisomerizing the diesel fuel product.

5. The method of claim wherein at least 95 wt % of the oxygen is removed from the blended feedstock.

6. The method of claim, wherein at least 98 wt % of the oxygen is removed from the blended feedstock.

7. The method of claim 1, wherein the oxygen content of the diesel fuel product is 0.1 wt % or less.

8. The method of claim 1, wherein the oxygen content of the diesel fuel product is 0.05 wt % or less.

9. The method of claim 1, wherein the oxygen content of the diesel fuel product is 0.01 wt % or less.

* * * * *